(12) United States Patent
Bae

(10) Patent No.: US 12,234,647 B2
(45) Date of Patent: Feb. 25, 2025

(54) REBAR COUPLER

(71) Applicant: Young Jae Bae, Cheongju-Si (KR)

(72) Inventor: Young Jae Bae, Cheongju-Si (KR)

( * ) Notice: Subject to any disclaimer, the term of this patent is extended or adjusted under 35 U.S.C. 154(b) by 846 days.

(21) Appl. No.: 17/299,052

(22) PCT Filed: Apr. 2, 2019

(86) PCT No.: PCT/KR2019/003833
§ 371 (c)(1),
(2) Date: Mar. 17, 2022

(87) PCT Pub. No.: WO2020/138594
PCT Pub. Date: Jul. 2, 2020

(65) Prior Publication Data
US 2022/0220742 A1 Jul. 14, 2022

(30) Foreign Application Priority Data
Dec. 27, 2018 (KR) .................. 10-2018-0170038

(51) Int. Cl.
E04C 5/16 (2006.01)
F16B 7/04 (2006.01)
(52) U.S. Cl.
CPC ............ E04C 5/165 (2013.01); F16B 7/0406 (2013.01); Y10T 403/5793 (2015.01)
(58) Field of Classification Search
CPC ......... Y10T 403/5733; Y10T 403/5793; E04C 5/165
See application file for complete search history.

(56) References Cited

U.S. PATENT DOCUMENTS 4,764,071 A * 8/1988 Lawrence ........... F16B 37/0864
411/433

FOREIGN PATENT DOCUMENTS

| KR | 20-0257716 Y1 | | 12/2001 | |
|---|---|---|---|---|
| KR | 20-0415715 | * | 5/2006 | ............ E04C 5/165 |
| KR | 10-0733233 B1 | | 6/2007 | |
| KR | 10-1643846 B1 | | 8/2016 | |
| KR | 10-1654145 | * | 9/2016 | ............ F16B 7/0406 |
| KR | 10-1856706 B1 | | 5/2018 | |
| KR | 10-1929179 B1 | | 12/2018 | |
| WO | WO 2014/123298 | * | 8/2014 | ............ E04C 5/165 |
| WO | WO 2016/006904 | * | 1/2016 | ............... E04C 5/16 |

* cited by examiner

Primary Examiner — Michael P Ferguson
(74) Attorney, Agent, or Firm — NKL LAW; Jae Youn Kim

(57) ABSTRACT

The present invention relating to a rebar coupler that mutually connects and fixes a rebar in a longitudinal direction comprises: a pair of coupler bodies that are formed in a cylindrical shape through which the inside is penetrated, formed of an inlet in one side through which the rebar is inserted, and formed of a fixing piece contact surface inclined toward the inlet inside the penetrated passage; a connecting unit disposed between the pair of coupler bodies to mutually couple the opposite ends of the inlet of each coupler body; a plurality of fixing pieces arranged radially inside the coupler body, wherein an outer surface is installed to contact the fixing piece contact surface, and wherein a plurality of locking protrusions are formed in the horizontal and vertical directions, respectively, to fix the rebar inserted through the inlet; and an elastic member provided inside the coupler body to press the plurality of fixing pieces toward the inlet.

8 Claims, 5 Drawing Sheets

REBAR COUPLER

TECHNICAL FIELD

The present invention relates to a rebar coupler, and more specifically to a rebar coupler capable of connecting a pair of rebars with each other when constructing a rebar concrete structure, etc., and effectively responding to torsion stress as well as tensile stress and compressive stress applied from the rebar.

BACKGROUND ART

In general, when constructing concrete buildings, etc., rebars are main materials for reinforcing the strength thereof. In order to increase bonding strength with concrete, protrusions such as nodes, ribs, etc. are formed on an outer circumferential surface in the axial line direction.

Since such rebars are manufactured in a rod shape, they are connected with each other in accordance with the height and length of the concrete structure in various construction sites.

In the past, the rebars are connected with each other by tying a portion where the rebars are in contact with each other with wires, etc. or by gas-welding, while the rebars overlap each other. However, when using wires, the wires are to be wound around the outer circumference of the rebars several times and then tied up. Thus, the work was inconvenient, and the center of rebars became tilted, not vertical, or the connected portion was easily cut. Also, when performing welding, the welding work was inconvenient, and the strength of the rebar connection portion varied depending on the skill level of workers. Thus, uniform quality could not be guaranteed.

Recently, as a result, rebar couplers in various shapes capable of mechanically connecting rebars are manufactured and commercialized.

However, conventional typical rebar couplers were designed only for the strength as to the tensile stress of rebar, without considering the rotating force or torsion stress. Thus, the rebar rotates in the coupler when it is twisted, and thereby the coupler loses the ability to fix the rebar. Accordingly, it is not sufficient to respond to various types of disasters.

Also, since the appearance of the rebar coupler itself is not considered for the bonding strength with concrete, the rebar coupler has relatively weaker bonding strength with concrete than the rebar having nodes and ribs formed thereon. Thus, the rebar coupler and the rebar have different bonding strength when coupling with concrete, which is a weak point of an entire structure.

Furthermore, when using a rebar coupler in the actual construction site, it is very difficult to insert the reeling rebar vertically into the rebar coupler. In the case of conventional rebar couplers, a fixing piece for fixing the rebar is installed inside a passage adjacent to an inlet into which the rebar is inserted. When the worker inserts the rebar through the inlet of the rebar coupler and the end of the rebar is inserted slantly, the end of the rebar wears down a locking protrusion formed in the fixing piece.

DETAILED DESCRIPTION OF INVENTION

Technical Task

It is an object of the present invention to provide a rebar coupler, specifically a rebar coupler capable of connecting a pair of rebars with each other when constructing a rebar concrete structure, etc., and effectively responding to torsion stress as well as tensile stress and compressive stress applied from the rebar.

Also, it is an object of the present invention to provide a rebar coupler which has an appearance capable of increasing bonding strength with concrete, and can prevent a locking protrusion formed in a fixing piece from being worn down by the end of a rebar during a process of inserting the rebar into the rebar coupler.

The technical tasks of the present invention are not limited to the foregoing, and a person skilled in the art can clearly understand other technical tasks not mentioned above from the following description.

Means for Solving Technical Task

In order to solve the technical task, the present invention provides a rebar coupler that connects rebars with each other and fixes the rebars in the longitudinal direction, which comprises a pair of coupler bodies that are formed in a cylindrical shape through which the inside is penetrated, formed of an inlet in one side through which the rebar is inserted, and formed of a fixing piece contact surface inclined toward the inlet inside the penetrated passage; a connecting unit disposed between the pair of coupler bodies to couple the opposite ends of the inlets of the respective coupler bodies with each other; a plurality of fixing pieces arranged radially inside the coupler body, wherein an outer surface is installed to contact the fixing piece contact surface, and wherein a plurality of locking protrusions are formed on an inner surface in the horizontal and vertical directions, to fix the rebar inserted through the inlet; and an elastic member provided inside the coupler body to press the plurality of fixing pieces toward the inlet.

Also, the present invention provides a rebar coupler which comprises a plurality of horizontal locking protrusions formed in the horizontal direction on the inner surface of the fixing piece and a plurality of vertical locking protrusions formed in the vertical direction on the inner surface of the fixing piece, wherein the plurality of locking protrusions are formed in a sawtooth shape.

Also, the present invention provides a rebar coupler, wherein a plurality of inclined surfaces which are inclined toward the inlet are formed at a certain interval along the circumference of the outer surface of the plurality of fixing pieces, and wherein the fixing piece contact surface inside the coupler body is formed to correspond to the plurality of inclined surfaces.

Also, the present invention provides a rebar coupler which comprises an elastic member comprising a pair of springs which are coaxially and doubly arranged.

Also, the present invention provides a rebar coupler wherein the pair of springs comprises a first spring which presses a plurality of fixing pieces and a second spring which is arranged inside the second spring and presses the plurality of fixing pieces that fix the rebar, while elastically supporting the rebar inserted by passing through the inlet of the coupler body and the fixing piece.

Also, the present invention provides a rebar coupler wherein an inlet passage with a certain length is formed in a passage between the inlet and the fixing piece contact surface inside the coupler body.

Also, the present invention provides a rebar coupler wherein a rib insertion groove into which a rib formed on the outer circumferential surface of the rebar is inserted is formed in the inlet and the inlet passage of the coupler body.

Also, the present invention provides a rebar coupler wherein a node and a rib are formed on the outer surface of the coupler body.

Also, the present invention provides a rebar coupler wherein the couple body is formed in any one of a cylindrical shape, an elliptic cylindrical shape or a polygonal prism shape.

Also, the present invention provides a rebar coupler wherein a support plate which supports the elastic member provided inside the coupler body is formed in the connecting unit, and wherein a pin hole is formed in the support plate at a certain interval.

Also, the present invention provides a rebar coupler wherein a circumference of the inlet of the coupler body is tapered at an angle of 20° to 45°.

Effect of Invention

The rebar coupler according to one embodiment of the present invention can effectively respond to torsion stress as well as tensile stress and compressive stress applied from the rebar when connecting and fixing a pair of rebars, and can have the same bonding strength with concrete as the rebar, thereby responding to various types of disasters.

Also, the rebar coupler can effectively prevent a phenomenon where a locking protrusion of a fixing piece is worn down which may occur during a process of inserting the rebar into the rebar coupler, and can be easily assembled with simple components, thereby reducing manufacturing costs and being easily utilized in the entire industry.

The effects of the present invention are not limited to the above-mentioned effects, and a person skilled in the art can clearly understand other effects not mentioned above from the following description.

BEST MODE FOR CARRYING OUT THE INVENTION

Figure 1:
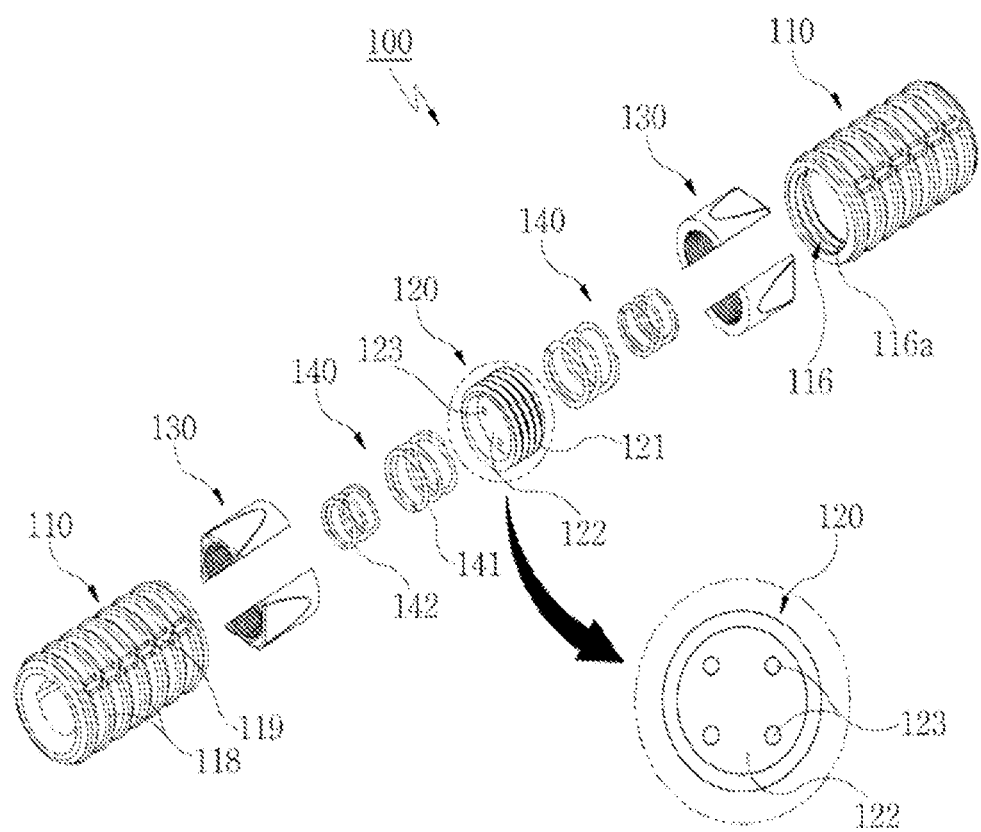
FIG. 1 explodedly illustrates an entire constitution of a rebar coupler according to a first embodiment of the present invention.

Hereinafter, preferred embodiments according to the present invention will be described in detail with reference to the accompanying drawings.

The following detailed description, together with the accompanying drawings, is intended to illustrate exemplary embodiments of the invention and is not intended to represent the only embodiments in which the invention may be carried out.

In order to clearly describe the present invention in the drawings, parts not related to the description may be omitted, and the same reference numerals may be used for the same or similar components throughout the specification.

In an embodiment of the present invention, the expressions "or," "at least one," etc. may denote one of the words listed together or may represent a combination of two or more.

Figure 2:
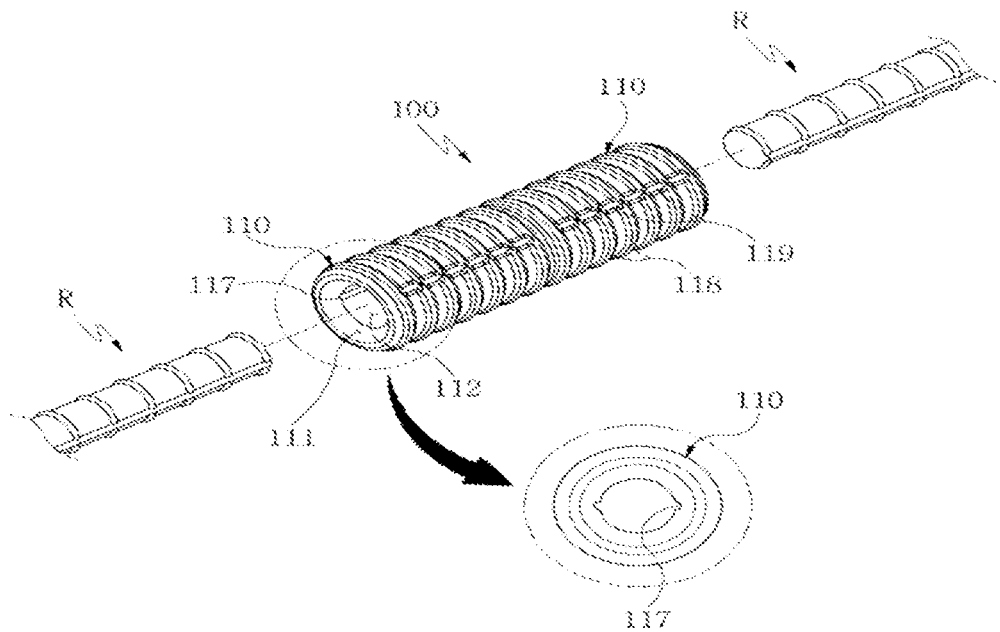
FIG. 2 illustrates a form where rebars are coupled to the rebar coupler according to the first embodiment of the present invention.
Figure 3:
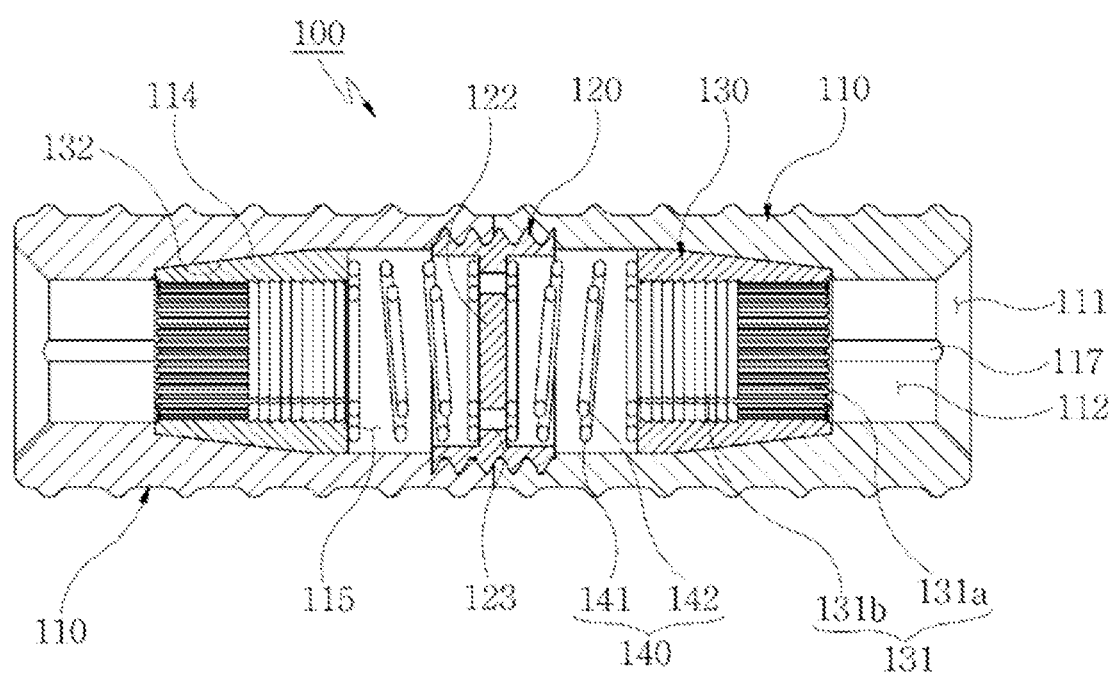
FIG. 3 is a cross-sectional view illustrating an inner structure of the rebar coupler according to the first embodiment of the present invention.

FIG. 1 explodedly illustrates an entire constitution of a rebar coupler 100 according to a first embodiment of the present invention, FIG. 2 illustrates a form where rebars R are coupled to the rebar coupler 100 according to the first embodiment of the present invention, and FIG. 3 is a cross-sectional view illustrating an inner structure of the rebar coupler 100 according to the first embodiment of the present invention.

Figure 4:
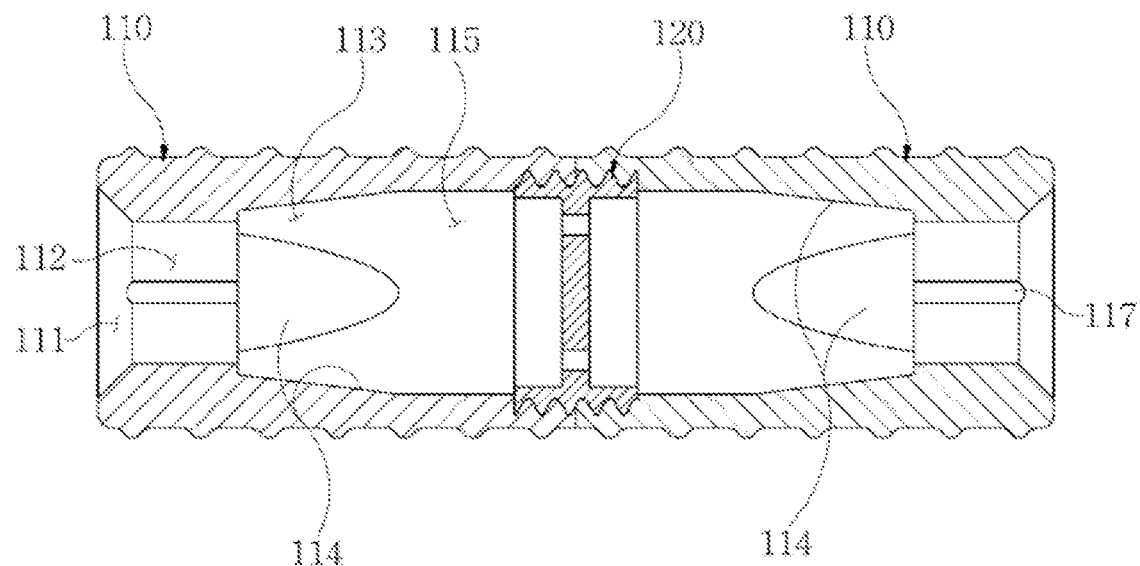
FIG. 4 is a cross-sectional view illustrating an inner structure of a coupler body according to the first embodiment of the present invention.
Figure 5:
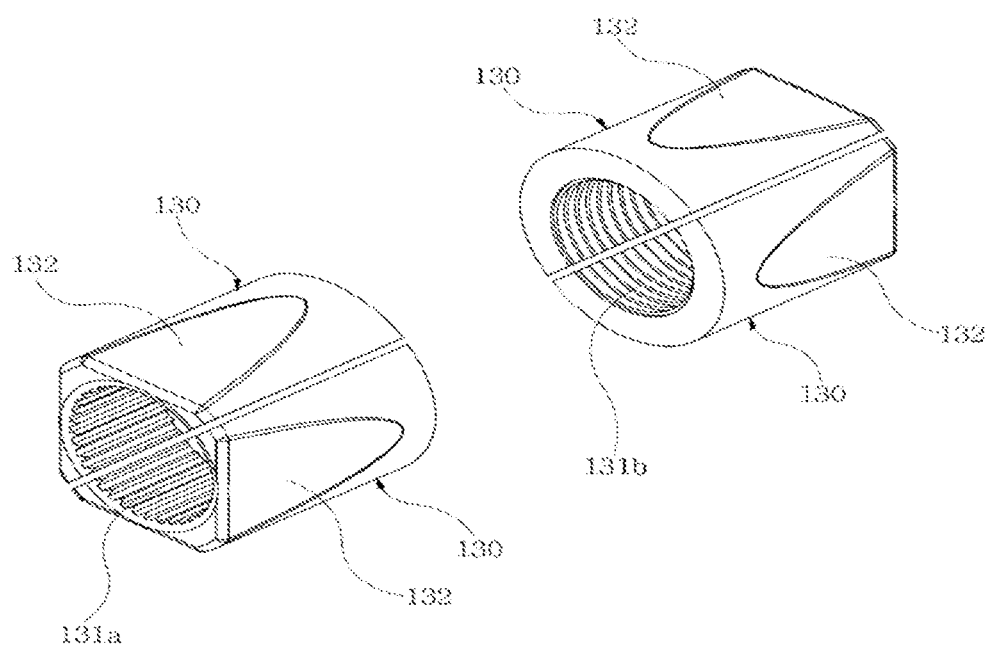
FIG. 5 illustrates a structure of a fixing piece according to the first embodiment of the present invention.

Additionally, FIG. 4 is a cross-sectional view illustrating an inner structure of a coupler body 110 according to the first embodiment of the present invention, and FIG. 5 illustrates a structure of a fixing piece 130 according to the first embodiment of the present invention.

Referring to FIG. 1 to FIG. 5, the rebar coupler 100 according to the first embodiment of the present invention may comprise a coupler body 110, a connecting unit 120, a fixing piece 130, and an elastic member 140.

The coupler body 110 forms the appearance of the rebar coupler 100 according to the present embodiment, and it may be provided in one pair to be symmetrically coupled with each other through the connecting unit 120.

Each coupler body 110 is formed in a cylindrical shape through which the inside is penetrated, wherein an inlet 111 into which the rebar R is inserted may be formed in one side, a fixing piece contact surface 114 inclined toward the inlet 111 may be formed in a passage penetrated inside the inlet 111, and a fastening unit 116 to which the connecting unit 120 is screw-coupled may be formed in another side.

Here, in order to easily insert the rebar R, the circumference of the inlet 111 into which the rebar R is inserted may be tapered at a certain angle, and the taper angle may be approximately 20° to 45°, preferably approximately 30°.

Also, as illustrated in FIG. 4, the passage which is penetrated inside the inlet 111 in the coupler body 110 may comprise an inlet passage 112 extending from the inlet 111 with the same diameter to a certain length, a first receiving passage 113 formed in the rear of the inlet passage 112, having the fixing piece contact surface 114, and a second receiving passage 115 formed in the rear of the first receiving passage 113.

In this case, in the coupler body 110, the inlet passage 112 connected with the inlet 111 may be a section where the rebar R is pulled in, the first receiving passage 113 may be a section where the fixing piece 130 for fixing the rebar R that is pulled in is installed, and the second receiving passage 115 may be a section where the elastic member 140 for supporting the fixing piece 130 is installed.

Here, the inlet 111 and the inlet passage 112 of the coupler body 110 may be formed to correspond to the diameter of the rebar R. A rib insertion groove 117 may be formed on the inner surface of the inlet 111 and the inlet passage 112 of the coupler body 110 so that a rib which protrudes more than a node can be easily inserted when inserting the rebar R into the inlet 111 of the coupler body 110.

Accordingly, the rebar R inserted into the inlet 111 and the inlet passage 112 of the coupler body 110 allows the rib to be inserted and coupled to the rib insertion groove 117, and the rebar R to be firmly coupled, not rotating, in the coupler body 110.

Also, the inlet passage 112 with a certain length is formed between the inlet 111 into which the rebar R is inserted and the first receiving passage 113 on which the fixing piece 130 is installed, in order to prevent a locking protrusion 131 formed in the fixing piece 130 from being worn down by the end of the rebar R during a process of inserting the rebar R into the inlet 111 of the coupler body 110.

In other words, the locking protrusion 131 for fixing the rebar R is formed on the inner surface of the fixing piece 130. The common rebar coupler had problems that the fixing piece is installed inside the passage adjacent to the inlet, and thus when the end of the rebar is slantly inserted during a process of inserting the rebar through the inlet of the rebar coupler at the site by a worker, the end of the rebar wears down the locking protrusion formed in the fixing piece.

Accordingly, according to an embodiment of the present invention, the inlet passage 112 with a certain length is formed between the inlet 111 of the coupler body 110 and the first receiving passage 113 on which the fixing piece 130 is installed, so that when the end of the rebar R is slantly inserted through the inlet 111, the end of the rebar R is brought into contact with the inlet passage 112, thereby effectively preventing a phenomenon where the locking protrusion 131 of the fixing piece 130 is worn down by the end of the rebar R.

Additionally, the fixing piece contact surface 114 inclined toward the inlet 111 is formed on the inner surface of the first receiving passage 113 on which the fixing piece 130 is installed in the coupler body 110. The fixing piece contact surface 114 may be formed in a shape corresponding to the appearance of the fixing piece 130. The detailed explanation therefor will be described later.

Also, the fastening unit 116 formed at the opposite end of the inlet 111 of the coupler body 110 is a portion to which the connecting unit 120 is screw-coupled, and as an example, may have a female thread 116a formed at the end in the inner surface of the second receiving passage 115.

Meanwhile, the embodiment of the present invention illustrates that the appearance of the coupler body 110 is formed in a cylindrical shape, but it not limited thereto. The appearance of the coupler body 110 may be formed in an elliptic cylindrical shape or a polygonal prism shape, etc. of course.

Furthermore, a node 118 and a rib 119 having the same shape as the rebar R may be formed on the outer circumferential surface of the coupler body 110. Accordingly, when the worker grips the coupler body 110, the sense of gripping can be provided. Additionally, when constructing concrete, the bonding force with the concrete can be maximized.

The connecting unit 120 may be arranged between a pair of coupler bodies 110 and coupled thereto to connect the opposite ends of the inlets 111 of the respective coupler bodies 110 with each other.

The connecting unit 120 is formed in a cylindrical shape, and may have a male thread 121 which is screw-coupled to the female thread 116a of the coupler body 110 formed on the outer circumferential surface thereof.

In this case, the embodiment of the present invention illustrates that the female thread 116a is formed in the coupler body 110, and the male thread 121 is formed in the connecting unit 120, but the embodiment is not limited thereto. Of course, the male thread may be formed in the coupler body 110, and the female thread may be formed in the connecting unit 120, to be screw-coupled with each other.

Also, a support plate 122 is formed inside the connecting unit 120, and the support plate 122 may support the elastic member 140 received in the coupler body 110 when coupling the connecting unit 120 to the coupler body 110.

Additionally, a plurality of pin holes 123 are formed in the support plate 122 at a certain interval, and thus the connecting unit 120 can be easily coupled to or separated from the fastening unit 116 of the coupler body 110 by using a tool such as a hole-type wrench, etc.

As an example, by coupling a pair of pins provided in the hole-type wrench to a pair of pin holes 123 among the plurality of pin holes 123 formed in the support plate 122 and rotating the hole-type wrench, the connecting unit 120 can be coupled to or separated from the fastening unit 116 of the coupler body 110.

A plurality of fixing pieces 130 are arranged radially in the first receiving passage 113 inside the coupler body 110, and thereby the rebar R inserted through the inlet 111 of the coupler body 110 can be fixed.

In this case, the plurality of fixing pieces 130 are formed to surround and fix the rebar R inserted through the inlet 111 of the coupler body 110. The embodiment of the present invention shows, as an example, a structure of surrounding and fixing the rebar R with a pair of fixing pieces 130 having semi-circular inner surfaces, respectively.

Specifically, as illustrated in FIG. 3 and FIG. 5, a pair of fixing pieces 130 according to the embodiment of the present invention may be installed such that the semi-circular inner surfaces are arranged to face each other, forming one group, and the outer surfaces contact the fixing piece contact surface 114 formed in the first receiving passage 113 of the coupler body 110.

In this case, a plurality of inclined surfaces 132 which are inclined toward one direction (toward the inlet 111 of the coupler body 110) are formed at a certain interval along the circumference of the outer surface of the pair of fixing pieces 130 forming one group. The outer surface of the fixing piece 130 having the inclined surfaces 132 may be formed to correspond to the fixing piece contact surface 114 formed in the first receiving passage 113 of the coupler body 110.

In other words, the inclined surfaces 132 are formed on four side surfaces on the circumference of the outer surface of the pair of fixing pieces 130 forming one group, and the fixing piece contact surface 114 with four inclined surfaces may be formed on the circumference of the inner surface of the first receiving passage 113 of the coupler body 110 corresponding thereto.

As illustrated in FIG. 5, the pair of fixing pieces 130 forming one group may have an appearance with one end thereof in a rectangular shape by the four inclined surfaces 132 formed on the circumference of the outer surface thereof and another end thereof in a circular shape.

By this structure, the pair of fixing pieces 130 installed inside the first receiving passage 113 of the coupler body 110 can be fixed so as not to rotate in the coupler body 110 such that the four inclined surfaces 132 formed in the pair of fixing pieces 130 are installed to be tightly engaged with the fixing piece contact surface 114 in the first receiving passage 113, thereby effectively responding to torsion stress while the pair of fixing pieces 130 fixes the rebar R.

The pair of fixing pieces 130 forming one group is supported by the elastic member 140, which will be described later, and tightly installed on the fixing piece contact surface 114 of the first receiving passage 113 in the coupler body 110. In this case, the pair of fixing pieces 130 retracts and thus can fix the rebar R through a plurality of locking protrusions 131 formed on the inner surface. Additionally, when the pair of fixing piece 130 move toward the second receiving passage 115 at a certain interval by an external force, the rebar R may enter the inside of the fixing piece 130 while the pair of fixing pieces 130 are separated from each other.

Here, the plurality of locking protrusions 131 formed on the inner surface of the fixing piece 130 may include a plurality of horizontal locking protrusion 131a formed in the horizontal direction and a plurality of vertical locking protrusions 131b formed in the vertical direction. The rebar R inserted into the inside of the fixing piece 130 is fixed with these pluralities of horizontal and vertical locking protrusions 131a, 131b. Thus, when fixing the rebar R through the fixing piece 130, torsion stress as well as tensile stress and compressive stress applied from the rebar R can be effectively responded.

In other words, as illustrated in FIG. 3, the embodiment of the present invention illustrates that the plurality of horizontal locking protrusions 131a formed in the horizontal direction are formed on the inner surface of the fixing piece 130 facing the inlet 111 of the coupler body 110, and that the plurality of vertical locking protrusions 131b are formed on the inner surface in the back thereof. In this case, the plurality of horizontal locking protrusions 131a can prevent torsion (or rotation) of the rebar R that is fixed to the fixing piece 130, and the plurality of vertical locking protrusions 131b can prevent separation of the rebar R that is fixed to the fixing piece 130 in the reverse direction.

In this case, the above-mentioned embodiment explains that the plurality of horizontal locking protrusions 131a are formed in one side of the inner surface of the fixing piece 130 facing the inlet 111 of the coupler body 110, and the plurality of vertical locking protrusions 131b are formed in another side thereof, but the embodiment is not necessarily limited thereto. It is obvious that the plurality of vertical locking protrusions 131b may be formed in one side of the inner surface of the fixing piece 130 and the plurality of horizontal locking protrusion 131a may be formed in another side thereof, and also that the plurality of vertical locking protrusions 131b and the horizontal locking protrusions 131a may be intersected with each other on the inner surface of the fixing piece 130.

Additionally, the plurality of horizontal and vertical locking protrusions 131a, 131b formed on the inner surface of the fixing piece 130 may be formed in a sawtooth shape so as to effectively fix the rebar R.

The elastic member 140 is provided in the second receiving passage 115 inside the coupler body 110 to press the fixing piece 130 toward the inlet 111 of the coupler body 110.

The elastic member 140 may include springs 141, 142, and one side of the springs 141, 142 is supported on the fixing piece 130 and another side thereof is supported on the support plate 122 of the connecting unit 120 within the second receiving passage 115 of the coupler body 110, thereby pressing the fixing piece 130 toward the inlet 111 of the coupler body 110.

In this case, the embodiment of the present invention increases a pressing force that presses the fixing piece 130 through a pair of springs 141, 142 which are coaxially and doubly arranged. Thereby, the pair of fixing pieces 130 receives a much stronger pressing force and can be in tight contact with the fixing piece contact surface 114 of the second receiving passage 115, and a clamping force which tightens the rebar R can be more increased when fixing the rebar R through the pair of fixing pieces 130.

In other words, by arranging the second spring 142 inside the first spring 141, the fixing piece 130 is directly supported and pressed by the first spring 141, and the end of the rebar R inserted by passing through the inlet 111 of the coupler body 110 and the fixing piece 130 is supported and pushed by the second spring 142. Accordingly, the pair of fixing pieces 130 that fixes the rebar R with the plurality of locking protrusions 131 is indirectly pressed, thereby tightening the rebar R with a much stronger force through the pair of fixing pieces 130.

In this case, the second spring 142 may buffer the rebar R inserted by passing through the inlet 111 of the coupler body 110 and the fixing piece 130.

Meanwhile, hereinafter, the process of connecting a pair of rebars R through the rebar coupler 100 according to the first embodiment of the present invention will be explained in detail.

Figure 6:
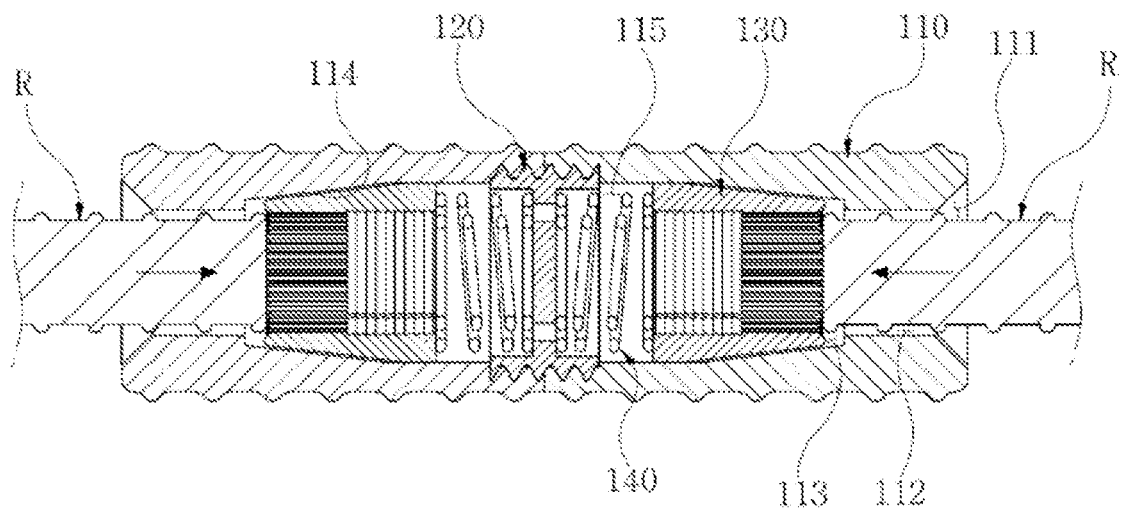
FIG. 6 and FIG. 7 illustrate a use state of the rebar coupler according to the first embodiment of the present invention.
Figure 7:
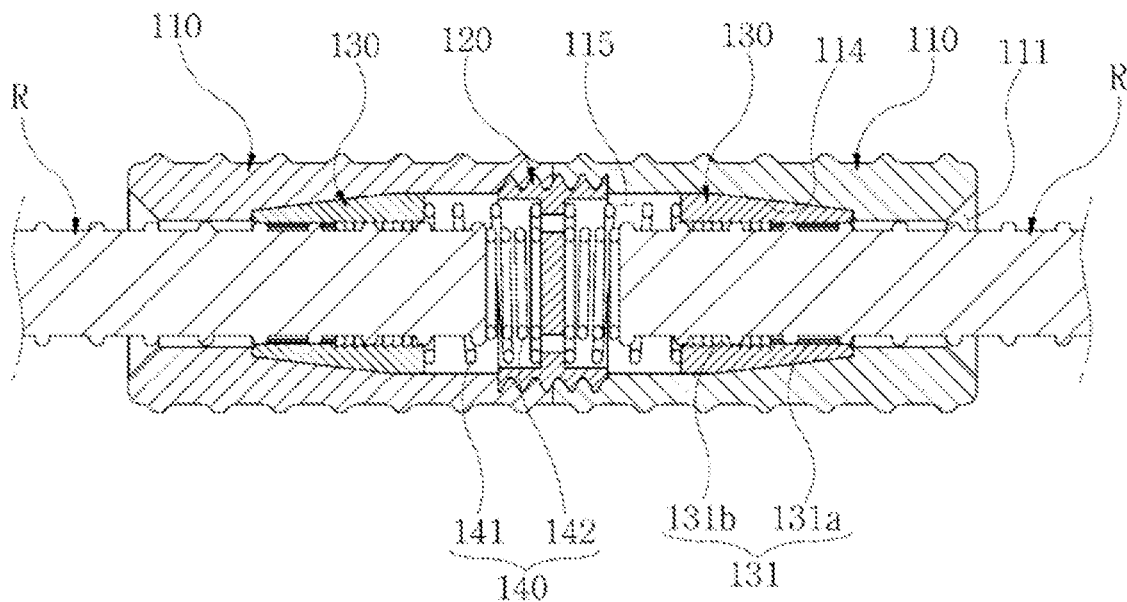

FIG. 6 and FIG. 7 illustrate the use state of the rebar coupler 100 according to the first embodiment of the present invention.

Referring to FIG. 6, in the process of connecting a pair of rebars R through the rebar coupler 100 in which a pair of coupler bodies 110 are symmetrically coupled to each other by the connecting unit 120, first, the rebars R may be inserted through the inlets 111 formed in the respective coupler bodies 110.

In this case, the circumference of the inlet 111 formed in the coupler body 110 is tapered at a predetermined angle, thereby facilitating insertion of the rebar R. Additionally, the rebar R inserted into the inlet 111 passes through the inlet passage 112 with a certain length and enters the fixing piece 130, and thus when the end of the rebar R is slantly inserted through the inlet 111, the end of the rebar R is brought into contact with the inlet passage 112, thereby effectively preventing a phenomenon where the locking protrusion 131 of the fixing piece 130 is worn down by the end of the rebar R.

Additionally, the rebar R inserted through the inlet 111 of the coupler body 110 passes through the inlet passage 112 and presses the front end of the pair of fixing pieces 130 provided in the first receiving passage 113 so that the elastic member 140 which elastically supports the pair of fixing pieces 130 may be compressed by a pressure of the fixing piece 130.

In this case, the pair of fixing piece 130 pressed by the rebar R inserted move from the first receiving passage 113 to the second receiving passage 115, and are separated apart from each other at the fixing piece contact surface 114. During this process, the rebar R is inserted into the inside of the pair of fixing pieces 130 which are separated apart from each other, and passes through the second receiving passage 115 to be supported on the support plate 122 of the connecting unit 120.

Also, referring to FIG. 7, when the rebar R is inserted into the second receiving passage 115 within the coupler body 110, the elastic member 140 which elastically supports the pair of fixing pieces 130 presses the pair of fixing pieces 130 toward the inlet 111 by a restoring force, and thereby the pair of fixing pieces 130 separated apart from each other contact the fixing piece contact surface 114 of the first receiving passage 113 (see FIG. 6) and retract along the inclined contact surface so that the plurality of locking protrusions 131 formed inside the pair of fixing piece 130 can be firmly pressed against the outer surface of the rebar R.

In this case, the plurality of locking protrusions 131 formed on the inner surface of the pair of fixing pieces 130 include a plurality of horizontal locking protrusions 131a formed in the horizontal direction and a plurality of vertical locking protrusions 131b formed in the vertical direction. When the pair of fixing pieces 130 presses and fixes the rebar R, the plurality of vertical locking protrusions 131b prevent separation of the rebar R in the reverse direction, and the plurality of horizontal locking protrusions 131a prevent torsion or rotation of the rebar R, thereby effectively responding to torsion stress as well as tensile stress and compressive stress applied from the rebar.

Furthermore, the elastic member 140 which presses the pair of fixing pieces 130 to retract includes a pair of springs 141, 142 which are doubly arranged, such that when fixing the rebar R through the pair of fixing pieces 130, a clamping force that tightens the rebar R can be more increased. Accordingly, the rebar R inserted into the coupler body 110 can be firmly fixed through the pair of fixing pieces 130 with a much stronger force.

In other words, the first spring 141 directly supports and presses the fixing piece 130, and the second spring 142 arranged inside the first spring 141 supports and pushes the end of the rebar R inserted by passing through the inlet 111 of the coupler body 110 and the fixing piece 130, to indirectly press the pair of fixing pieces 130 that fix the rebar R with the plurality of locking protrusions 131, thereby tightening the rebar R with a much stronger force through the pair of fixing pieces 130.

By the above process, the pair of rebars R respectively inserted into the two inlets 111 of the rebar coupler 100 are firmly fixed, thereby connecting the pair of rebars R with each other.

Figure 8:
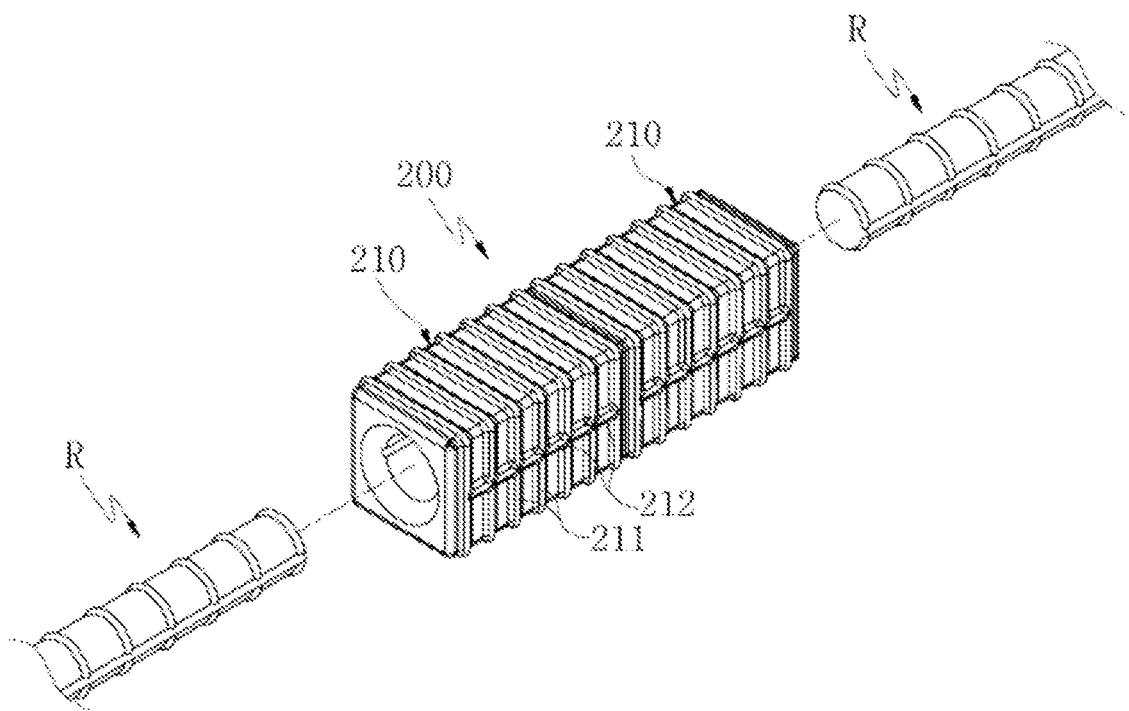
FIG. 8 illustrates a rebar coupler according to a second embodiment of the present invention.

Meanwhile, FIG. 8 illustrates a rebar coupler 200 according to a second embodiment of the present invention.

Referring to FIG. 8, the rebar coupler 200 according to the second embodiment of the present invention may include a connecting unit 120, a fixing piece 130, and an elastic member 140 with the same constitution as the rebar coupler 100 according to the first embodiment described above, simply differing in appearance of a coupler body 210.

That is, the coupler body 210 according to the second embodiment may be formed in a rectangular prism shape through which the inside thereof is penetrated, and an inner structure thereof may be formed in the same manner as the coupler body 110 according to the first embodiment explained above.

Since the coupler body 210 is formed in a rectangular prism shape, the worker at the site can grip a pair of coupler bodies 210 to be more easily separated from or coupled to each other.

Furthermore, a node 211 and a rib 212 having the same shape as the rebar R may be formed on the outer surface of the coupler body 210, thereby maximizing the bonding force with concrete.

As explained above, the rebar coupler 100 according to the embodiments of the present invention can effectively respond to torsion stress as well as tensile stress and compressive stress applied from the rebar R, when connecting and fixing a pair of rebars R, and can have the same bonding strength with concrete as the rebar R, thereby responding to various types of disasters.

Also, the rebar coupler can effectively prevent a phenomenon where the locking protrusion 131 of the fixing piece 130 is worn down which may occur during a process of inserting the rebar R into the rebar coupler 100, and can be easily assembled with simple components, thereby reducing manufacturing costs and being easily utilized in the entire industry.

The embodiments of the present invention disclosed in the present specification and drawings are merely illustrative examples of the present invention to easily explain the technical disclosure of the present invention and facilitate understanding of the present invention, and are not intended to limit the scope of the present invention.

Accordingly, in addition to the embodiments disclosed above, all modifications or changes derived based on the technical idea of the present invention should be construed as being included in the scope of the present invention.

What is claimed is:

1. A rebar coupler that connects rebars with each other and fixes the rebars in a longitudinal direction, comprising:
    a pair of coupler bodies each having a cylindrical shape through which an inside is penetrated to have a passage, each including an inlet in one side through which one of the rebars is inserted, and each having a fixing piece contact surface inclined toward the inlet inside the penetrated passage;
    a connector disposed between the pair of coupler bodies to couple opposite ends of the inlets of the respective pair of coupler bodies with each other;
    a plurality of fixing pieces arranged radially inside each coupler body, wherein a plurality of inclined surfaces inclined toward the inlet are formed on a circumference of an outer surface at an interval so that the outer surface is installed to be in surface contact with the plurality of fixing pieces, wherein a plurality of axially-extending horizontal locking protrusions which line contact an outer circumferential surface of the rebar in a direction parallel to the longitudinal direction of the inserted rebar are formed in one side of an inner surface of each fixing piece so that the rebar coupler can prevent relative rotation of the rebar when fixed therein and a plurality of circumferentially-extending vertical locking protrusions which line contact the outer circumferential surface of the rebar in a direction transverse to the longitudinal direction of the inserted rebar are formed in another side of the inner surface of each fixing piece so that the rebar coupler can prevent axial separation of the rebar when fixed therein, while fixing the rebar inserted into the inside through the inlet; and
    an elastic member provided inside each coupler body to press the plurality of fixing pieces toward the inlet,
    wherein the plurality of fixing pieces arranged in each coupler body comprise at least two fixing pieces forming one group, the at least two fixing pieces form four inclined surfaces inclined toward the inlet at an interval on a circumference of the outer surface, and one end of the outer surface is formed in a rectangular shape and another end thereof is formed in a circular shape, and wherein the fixing piece contact surface inside each coupler body is formed to correspond to the outer surface of the at least two fixing pieces.

2. The rebar coupler of claim 1, wherein an inlet passage with a length is formed in the penetrated passage between the inlet and the fixing piece contact surface inside each coupler body, and wherein a rib insertion groove into which a rib formed on the outer circumferential surface of the rebar is inserted is formed in the inlet and the inlet passage.

3. The rebar coupler of claim 1, wherein the elastic member comprises a pair of springs which are coaxially and doubly arranged.

4. The rebar coupler of claim 3, wherein the pair of springs comprises:
    a first spring configured to press the plurality of fixing pieces; and a second spring arranged inside the first spring and configured to buffer the rebar, while elastically supporting the rebar inserted and passing through the inlet of each coupler body and the plurality of fixing pieces.

5. The rebar coupler of claim 1, wherein a node and a rib are formed on the outer surface of each coupler body.

6. The rebar coupler of claim 1, wherein each coupler body is formed in one of a cylindrical shape, an elliptic cylindrical shape or a polygonal prism shape.

7. The rebar coupler of claim 1, wherein a support plate which supports the elastic members provided inside the pair of coupler bodies is formed in the connector, and wherein a pin hole is formed in the support plate at an interval.

8. The rebar coupler of claim 1, wherein a circumference of the inlet of each coupler body is tapered at an angle of 20° to 45°.

* * * * *